(12) United States Patent
Vidovic et al.

(10) Patent No.: US 6,933,490 B1
(45) Date of Patent: Aug. 23, 2005

(54) METHOD AND DEVICE FOR FIBER-OPTICAL MEASURING SYSTEMS

(75) Inventors: Nevio Vidovic, Kållered (SE); Martin Krantz, Västra Frölunda (SE); Svante Höjer, Kungälv (SE); Thorleif Josefsson, Partille (SE)

(73) Assignee: Samba Sensors AB, Gothenburg (SE)

( * ) Notice: Subject to any disclaimer, the term of this patent is extended or adjusted under 35 U.S.C. 154(b) by 283 days.

(21) Appl. No.: 10/019,675

(22) PCT Filed: Jul. 3, 2000

(86) PCT No.: PCT/SE00/01404

§ 371 (c)(1),
(2), (4) Date: Apr. 25, 2002

(87) PCT Pub. No.: WO01/02824

PCT Pub. Date: Jan. 11, 2001

(30) Foreign Application Priority Data

Jul. 6, 1999 (SE) .................................. 9902590

(51) Int. Cl.[7] .............................................. G01J 1/04
(52) U.S. Cl. ........................ 250/227.14; 250/227.16; 385/13
(58) Field of Search ................ 250/227.14, 227.15, 250/227.16, 227.19, 227.27, 221; 385/9, 385/12, 13; 356/73.1; 600/485, 488

(56) References Cited

U.S. PATENT DOCUMENTS

| | | | |
|---|---|---|---|
| 4,421,979 A | 12/1983 | Asawa et al. | |
| 4,487,206 A | * 12/1984 | Aagard | ........................ 600/480 |
| 4,933,545 A | 6/1990 | Saaski et al. | |
| 5,012,809 A | 5/1991 | Shulze | |
| 5,051,578 A | 9/1991 | Slemon et al. | |

(Continued)

FOREIGN PATENT DOCUMENTS

EP 0405752 A2 1/1991

(Continued)

*Primary Examiner*—Kevin Pyo
(74) *Attorney, Agent, or Firm*—Burns, Doane, Swecker & Mathis, L.L.P.

(57) ABSTRACT

The invention relates to a method for optical measuring systems, comprising a sensor element (6) connected to a measuring and control unit (10) via an optical connection (3), and being adapted for providing a signal defining a measurement of a physical parameter (p) influencing the sensor element (6), said method comprising generation of a measuring signal that is brought to come in towards the sensor element (6), and detection of the intensity of the measuring signal (B) in the measuring and control unit (10), after influencing the measuring signal in the sensor element (6). The invention is characterised by comprising partial reflection of the measuring signal at a point along the optical connection (3), at a predetermined distance from the sensor element (6), detection of the intensity of the signal (A), corresponding to said partially reflected measuring signal, and determination of a measurement of said parameter (p) based upon the intensity of the partially reflected signal (A) and the intensity of the measuring signal (B). The invention also relates to a device for carrying out said method. Through the invention, measurements with an optical pressure measuring system are allowed, which exhibit effective compensation for any existing sources of error.

11 Claims, 1 Drawing Sheet

U.S. PATENT DOCUMENTS

| | | | |
|---|---|---|---|
| 5,107,847 A | * | 4/1992 | Knute et al. .............. 600/488 |
| 5,280,173 A | | 1/1994 | Morse et al. |
| 5,610,393 A | | 3/1997 | Klimcak et al. |
| 5,657,405 A | | 8/1997 | Fujiwara |

FOREIGN PATENT DOCUMENTS

| | | |
|---|---|---|
| EP | 0457941 A1 | 11/1991 |
| EP | 0514747 A2 | 11/1992 |

* cited by examiner

METHOD AND DEVICE FOR FIBER-OPTICAL MEASURING SYSTEMS

TECHNICAL FIELD

The present invention relates to a method for measuring systems. The invention is especially intended for use with intensity-based fibre-optical measuring systems for pressure measurements. The invention also relates to a device for carrying out such a method.

BACKGROUND ART

In connection with measuring physical parameters such as pressure and temperature, it is previously known to utilise various sensor systems by which the optical intensity of a ray of light, conveyed through an optical fibre and coming in towards a sensor element, is influenced due to changes in the respective physical parameter. Such a system may for example be used when measuring the blood pressure in the veins of the human body. Said system is based upon a transformation from pressure to a mechanical movement, which in turn is transformed into an optical intensity, conveyed by an optical fibre, which is in turn transformed into an electrical signal that is related to the measured pressure.

According to known art, such a fibre-optical measurement system may comprise a pressure sensor, an optical fibre connected to said pressure sensor, and at least one light source and at least one light detector located at the opposite end of the fibre, in order to provide the pressure sensor with light, and to detect the information-carrying light signal returning from the pressure sensor, respectively.

One problem occurring with previously known systems of the above kind relates to the fact that the detected signal will be influenced by various interference factors in connection with the measuring system. For example, the signal may be influenced by any bending of the optical fibre, and by temperature changes and ageing of the optical fibre or of said light source. Also factors such as fibre couplings and fibre connectors in the measuring system in question may influence the information-carrying signal (for example through influencing its intensity in an unwanted manner) and thus also the final measuring result.

As a result of the above problems there is a need for devices and methods arranged for compensation of any existing sources of error and interference in connection with optical measurements of for example pressure.

There are several previously known measuring systems in which a measuring signal is used together with a separate reference signal. A certain measuring system category is based upon conveying light through two different optical fibres, and is used for said purpose. One example of such a system is shown in the patent document U.S. Pat. No. 5,657,405, which describes a fibre-optical measuring system used for measuring of e.g. pressure. In this system, the interference occurring between two optical conduits through which two corresponding laser light signals are directed towards a membrane, is utilised. One of these light signals is hereby used as a reference signal.

Another previously known category of systems is based on generating and utilising light of two different wavelengths, whereby a reference signal may be obtained. Systems of this kind are previously known from for example the patent documents U.S. Pat. No. 5,280,173 and U.S. Pat. No. 4,933,545.

One disadvantage with the systems according to the two categories mentioned above is that they are relatively complex in their structure. They further require a relatively large number of critical components in the form of LED:s, optical fibres, etc.

DISCLOSURE OF INVENTION

A primary object of the present invention is to provide an improved measuring system, with the aid of which unwanted influences from sources of error and interference in intensity-based fibre-optical measuring systems can be minimised. This is achieved by means of a method and a device in accordance with the present invention.

The invention is intended for use in optical measurement systems comprising a sensor element connected to a measuring and control unit via an optical connection, and that are adapted for providing a signal corresponding to a measurement of a physical parameter acting upon the sensor element. The invention consists of a method comprising the generation of a measuring signal that is brought to come in towards the sensor element, and the detection of the intensity of the measuring signal in the measuring and control unit, after influencing the measuring signal in the sensor element. The invention is characterised by comprising partial reflection of the measuring signal at a point along the optical connection, at a predetermined distance from the sensor element, detection of the intensity of the signal corresponding to said partially reflected measuring signal, and determination of a measurement of said parameter based on the intensity of the partially reflected signal and the intensity of the measuring signal.

Through the invention a substantial advantage is achieved, as it can be utilised in a simple and effective manner for compensation of sources of error and interference by intensity-based optical measurements of e.g. pressure.

It is a further object of the invention to provide a method for an optical measuring system, wherein a signal is brought to come in towards a sensor element, and wherein a measurement of the length of an optical connection between said sensor element and a measuring and control unit can be determined in a simple and efficient manner. This measurement can in turn be used to obtain improved measurements.

Said method is based especially upon a determination of a measurement of the length of said optical connection, based on a measured period of time passing from the generation of said signal and up to the detection of said signal. With such a method, the length determination may be used for identification of which sensor element that is currently being connected to the subject measuring and control unit. Hereby, the length of the optical connection is chosen so as to correspond to a specific type of sensor element.

Advantageous embodiments of the invention are defined by the subsequent dependent claims.

BRIEF DESCRIPTION OF DRAWINGS

The invention will be explained in more detail below, with reference to a preferred embodiment and to the enclosed drawings, in which.

PREFERRED EMBODIMENTS

Figure 1:
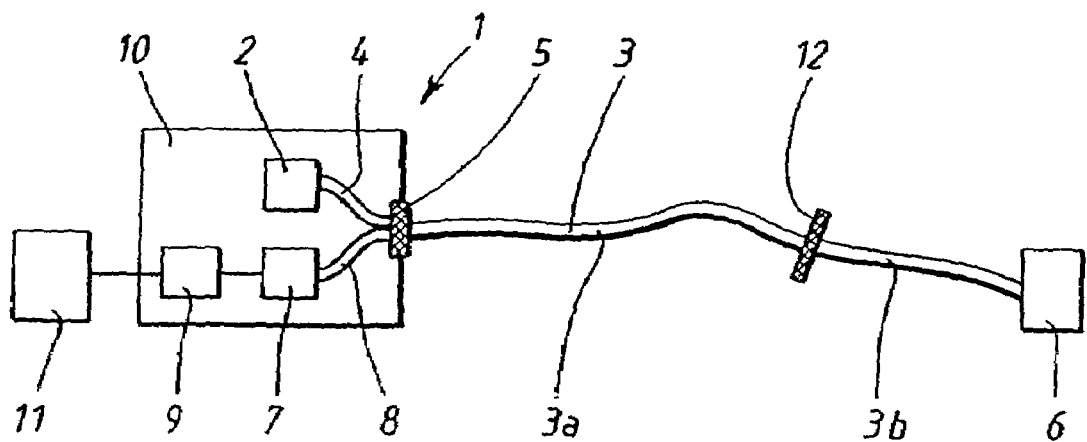
FIG. 1 shows, schematically, a measuring system according to the present invention.

FIG. 1 shows, schematically and somewhat simplified, an intensity-based fibre-optical measuring system 1 according to the present invention. According to a preferred embodiment, the measuring system is designed for pressure measurements, but alternatively, the invention could be used e.g. for measuring temperature or acceleration.

To the measuring system 1 belongs a light source in the form of an LED 2 functioning to emit a light signal of a predetermined wavelength $\lambda_1$. The LED 2 is connected to an optical connection, preferably in the form of an as such previously known optical fibre 3, by means of a first link 4 and a fibre coupling 5. The optical fibre 3 is in turn connected to a sensor element 6.

Figure 1A:
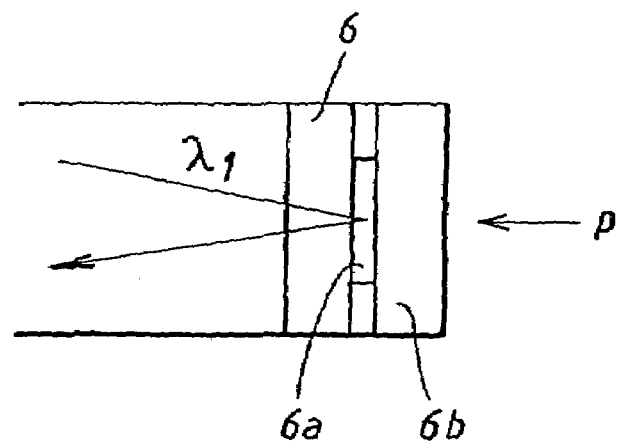
FIG. 1a shows an enlarged view of a sensor element suitable for use in connection with the invention.

According to what is shown in detail by FIG. 1a, which is an enlarged view of the sensor element 6, said element comprises a cavity 6a, for example obtainable (according to known art) through construction by means of molecular layers (primarily silicone, alternatively silicone dioxide or a combination of the two) and an etching procedure. Preferably, a bonding procedure is also utilised in assembling the various layers of the sensor element 6. The manufacture of such a sensor element 6 is as such previously known, e.g. from the Patent Document PCT/SE93/00393. In this way, a membrane 6b is also created within the sensor element 6, the deflection of which membrane will depend on the pressure p influencing the sensor element 6.

According to what will be described in detail below, the above light signal will be brought to come in towards the pressure sensor 6, i.e. towards its cavity 6a. Hereby, the pressure p acting on the membrane 6b will modulate the light signal. When the membrane 6b is influenced by a certain pressure p, the dimensions of the cavity 6a, primarily its depth d, will change, entailing a modulation of the light signal through optical interference inside the cavity 6a.

When designing the sensor element 6, the depth d of the cavity 6a is selected to be a value of substantially the same magnitude as the wavelength $\lambda_1$ of the light signal. The sizing of the cavity 6a is further made considering the required application area for the sensor element 6, in the current case primarily the pressure range to which the sensor element 6 is to be adapted.

According to the invention, the light signal consists of a pulse of relatively short duration. In normal applications, using an optical fibre 3 with a length of about 2–10 m, the pulse duration is in the order of 10–50 ns. However, the invention is not so limited, but could also be realised with a pulse length deviating from this interval. For example, pulses of longer duration are used in those cases where very long optical fibres (e.g. 100–200 m) are used.

The light pulse thus defines a measuring signal that is transmitted through the fibre 3 and fed into the sensor element 6. The light pulse will be modulated in the manner described above by means of the cavity 6a and is thereby provided with information corresponding to the current pressure p. The light signal modulated by the sensor element 6 is then transmitted back through the fibre 3 and conveyed to a light-sensitive detector 7, through said fibre coupling 5 and a further fibre link 8. The detector 7 is functioning to detect, in a known manner, the intensity of the reflected measuring signal.

For processing of the light signal detected by the detector 7, the measuring system according to the invention also comprises an evaluation unit 9. The evaluation unit 9 thus defines, together with the LED 2, the links 4, 8, the coupling 5 and the detector 7, a measuring and control unit 10, which in turn is connected to a presentation unit 11, e.g. in the form of a display, by the aid of which a measurement of the current pressure p can be visualised for a user.

The two links 4, 8 preferably consist of optical fibres of an as such known kind, the fibre coupling 5 thereby comprising an as such known fibre junction device designed so as to transfer the two fibre links 4, 8 into the fibre 3 leading to the sensor element 6.

It is a basic principle behind the invention that a semi-reflecting device 12 is provided along the optical fibre 3, at a predetermined distance from the sensor element 6. This device 12, according to the embodiment, consists of a so-called ferrule, i.e. a separate, tube-like unit for interconnection of optical fibres, arranged in such a manner that the light pulse emitted from the LED 2 will be partially reflected back to the detector 7, i.e. without having run up to and being influenced by the sensor element 6. The optical connection 3, according to the embodiment, is thus in practice comprised of a first optical conductor 3a that is coupled to a second optical conductor 3b via said ferrule 12. Between the two optical conductors 3a, 3b, a small air gap is hereby provided by means of the ferrule, at which gap said partial reflection will occur.

The invention is not limited to the reflecting device 12 described above. Alternatively, other forms of mirrors, or reflecting coatings and surfaces, may be used to provide a partially reflecting device creating the described light reflection.

Out of the light pulse emitted by the LED 2, two returning light pulses are thus created, i.e. a measuring signal that reaches the sensor element 6 and is then returned, and a reference signal that is returned directly at the reflecting device 12.

The returning light signals will run, via the fibre coupling 5, into the second fibre link 8 and to the detector 7. The detector 7 will hereby detect the intensity of the measuring signal and the reference signal, respectively. Because the reflecting device 12 is arranged at a predetermined distance from the sensor element 6, the reference signal will reach the light detector 7 a short time period before the measuring signal, reflected at the sensor element 6, will reach the light detector 7. The time period elapsing between the detection of the two signals will hereby depend on the position along the optical fibre 3 at which the reflecting device 12 is arranged, i.e. said period of time will depend on the distance between the reflecting device 12 and the sensor element 6.

Figure 2:
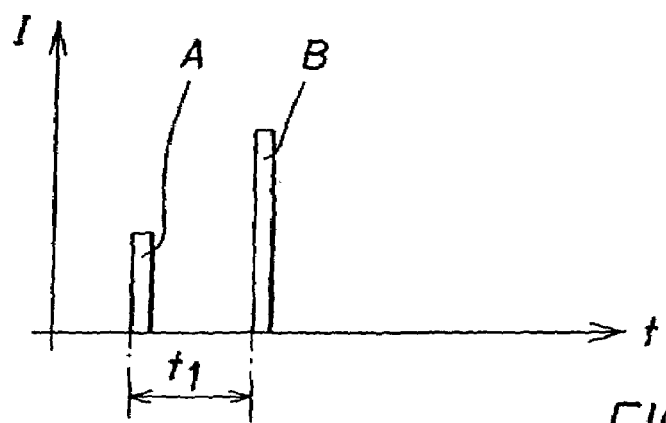
FIG. 2 shows a graph illustrating how light signals are detected according to the invention.

With reference to FIG. 2, there is shown, schematically, how two pulses generated in the above manner are detected by means of the detector 7. FIG. 2 thus illustrates the intensity I of the detected pulses, as a function of time t. From the figure it can be gathered that a first pulse A, resulting from the above light signal being reflected against the reflecting device 12, reaches the detector 7, said detector 7 hereby being adapted to determine a value of the intensity $I_A$ of said pulse A. Furthermore, a second pulse B is coming in towards the detector 7 a certain period of time $t_1$ after the first pulse A having reached the detector 7. The intensity $I_B$ of the second pulse B is also detected by the detector 7. The second pulse B hereby corresponds to the above measuring signal, i.e. a light signal having been modulated in the sensor element 6 and thus containing information regarding the pressure p acting on the sensor element 6 (compare FIG. 1a).

Furthermore, the evaluation unit 9 is adapted to calculate the quotient of the two intensity values of the respective pulses, that is $I_A/I_B$. Through the invention, a measurement is thus obtained, where the measuring signal (i.e. the second pulse B) defines a measurement of the pressure p, including the effects of any sources of error, and where the reference signal (i.e. the first pulse A) only corresponds to the effects of any sources of error. Through calculating said quotient, a measurement of the current pressure is obtained, where factors reflecting sources of error and interference have thus been compensated for. This is of course an advantage, as it will lead to less interference-sensitive measurements. As examples of unwanted sources of error, any bending of the optical fibre, temperature changes and ageing of the optical fibre or the LED 2, may be mentioned, as well as any changes occurring in the fibre coupling 5.

In essence, it applies that the first pulse A defines a reference signal that can be used to compensate for the effects of any interference in connection with measurements with the measuring system according to the invention.

In order to be able to separate the two pulses A and B during detection in the detector 7, it is required that the period of time $t_1$ exceeds a minimum limit value. This limit value is depending on how high a resolution that can be achieved with the aid of the measuring and control unit 10. For normal applications, this limit value $t_1$ is in the order of 10 ns. For normal applications, with optical fibres of the length 2–10 m, it is therefore suitable that the reflecting device 12 is located at about half the distance between the measuring and control unit 10 and the sensor element 6.

According to a variant of the invention (not shown in the figures), the latter can be arranged so as to send one single pulse to two or more branches, in turn comprising two or more optical fibres with a corresponding number of sensor elements. Along each one of the optical fibres, a reflecting device of the above kind will then be provided. By means of suitable location of the respective reflecting devices along each optical fibre, reference signals and measuring signals from each branch can be obtained and detected at predetermined intervals. In this connection, the length of each optical fibre and the location of each individual mirror device must be adapted in such a way that all measuring and reference signals can be individually separated. These signals can then be detected and evaluated in a manner analogous with the above description.

With the aim of providing an especially efficient pressure measurement, the invention could be used for detection of the periods of time elapsing from the generation of a certain light pulse at the LED 2 until it is detected in the detector 7. By means of measured values of such periods of time (and with knowledge of the propagation velocity of the light pulses along the optical connection 3 in question) a measurement of the length of the optical connection between the measuring and control unit 10 and the reflecting device 12, and between the measuring and control unit 10 and the sensor element 6, respectively, can be calculated. If the individual sensor element 6 is fitted to an optical connection given a predetermined, unique length, this type of detection can be utilised for carrying out an identity check of the individual sensor element. For example, a measured length of the optical connection of 2 m could hereby be said to correspond to a first type of sensor element, whereas a measured length of the optical connection of 3 m could correspond to a second type of sensor element. In this way, the invention could be used in such a manner that the measuring and control unit 10, by detecting the length of a certain optical connection, first identifies what type of sensor element is currently connected. Subsequently, the measuring and control unit 10 may, during the continued measurements, utilise for example information regarding calibration and other similar data, specifically relating to the currently connected sensor element. This type of information would hereby preferably be pre-stored in the measuring and control unit 10 and be used for the individual sensor elements that a specific measuring and control unit 10 is intended to be used with. Through introducing, for example, data regarding the calibration of a specific sensor element to be introduced into the measurements, the invention thus allows improved measurements.

The invention is not limited to the embodiment described above, but may be varied within the scope of the appended claims. For example, the principle behind the invention could be used also for systems not intended for pressure measurements.

Instead of a calculation of the quotient of two intensity values of two light signals, i.e. $I_A/I_B$ (according to the description above), a calculation of the difference $(I_A-I_B)$ between said two values could be performed in the measuring and control unit. Also in this case, a compensation for any sources of error and interference is obtained. According to a further conceivable solution, the two light signals $I_A$, $I_B$ could be comprised as input parameters in an appropriately formed function, by the aid of which a compensation for sources of error would be provided.

What is claimed is:

1. A method for optical measuring systems, comprising a sensor element connected to a measuring and control unit via one single optical fiber and being adapted for providing a signal corresponding to a measurement of a physical parameter influencing the sensor element, said method comprising the steps of:

generation of a measuring signal that is brought to come in towards the sensor element, and detection of said measuring signal in the measuring and control unit by a single detector, after influencing the measuring signal in the sensor element, partial reflection of the measuring signal at a point along the one single optical fiber, located at a predetermined distance from the sensor element, detection of the intensity of the signal corresponding to said partially reflected measuring signal by said single detector, and determination of a measurement of said parameter based upon the intensity of the partially reflected signal and the intensity of the measuring signal.

2. The method according to claim 1, characterized by comprising:

determination of a value corresponding to the quotient of the intensity of said reflected signal and the intensity of said measuring signal, and determination of a measurement of said parameter based upon said quotient.

3. The method according to claim 1, characterized by comprising:

determination of a value corresponding to the difference between the intensity of said reflected signal and the intensity of said measuring signal, and determination of a measurement of said parameter based upon said difference.

4. A method according to claim 1, characterized by said measuring signal being a light pulse.

5. A method according to claim 1, characterized by the feeding of the measuring signal into the sensor element causing optical interference in a cavity of the sensor element.

6. A method according to claim 1, characterized by being used for measuring pressure, said sensor element defining a membrane, acted upon by the pressure surrounding the sensor element.

7. A method according to claim 1, characterized by being used for measuring the acceleration or the temperature of said sensor element.

8. A device for optical measuring systems, comprising:
a sensor element connected to a measuring and control unit via one single optical fiber and being adapted for providing a signal corresponding to a measurement of a physical parameter influencing the sensor element,
a light source functioning to generate a measuring signal brought to come in towards the sensor element,
a detector for detecting the intensity of the measuring signal in the measuring and control unit, after influencing the measuring signal in the sensor element,
a semi-reflecting device for partial reflection of the measuring signal at a point along the one single optical fiber at a predetermined distance from the sensor element,
said detector being arranged for detection of the intensity of the signal corresponding to said partially reflected measuring signal, and
an evaluation unit for determining a measurement of said parameter, based upon the intensity of the partially reflected signal and the intensity of the measuring signal from said detector.

9. The device according to claim 8, characterized by said sensor element comprising a cavity, shaped so as to create optical interference when feeding said measuring signal into the cavity.

10. The device according to claim 9, characterized by said cavity being obtained through building up molecular silicone and/or silicone dioxide layers, and an etching procedure.

11. The device according to claim 10, characterized by said cavity being obtained through utilizing a bonding procedure.

* * * * *